Figure 1:
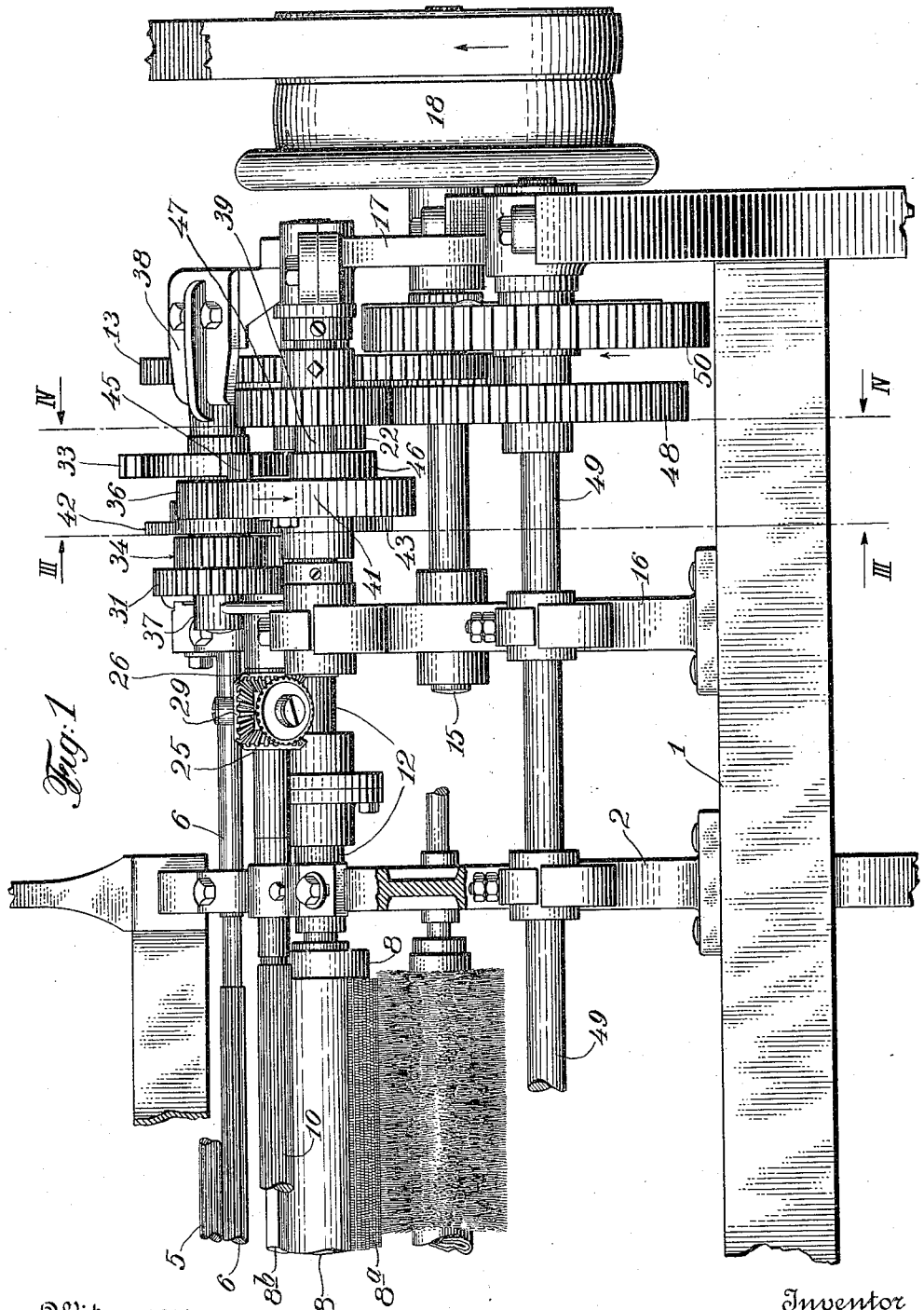

R. B. CHACE.
COMBING MACHINE.
APPLICATION FILED DEC. 20, 1910.

1,133,006.

Patented Mar. 23, 1915.
7 SHEETS—SHEET 3.

Witnesses:
Leon H. Horner.
Harmon O. Nelson.

Inventor
Richard B. Chace
By
Attorney

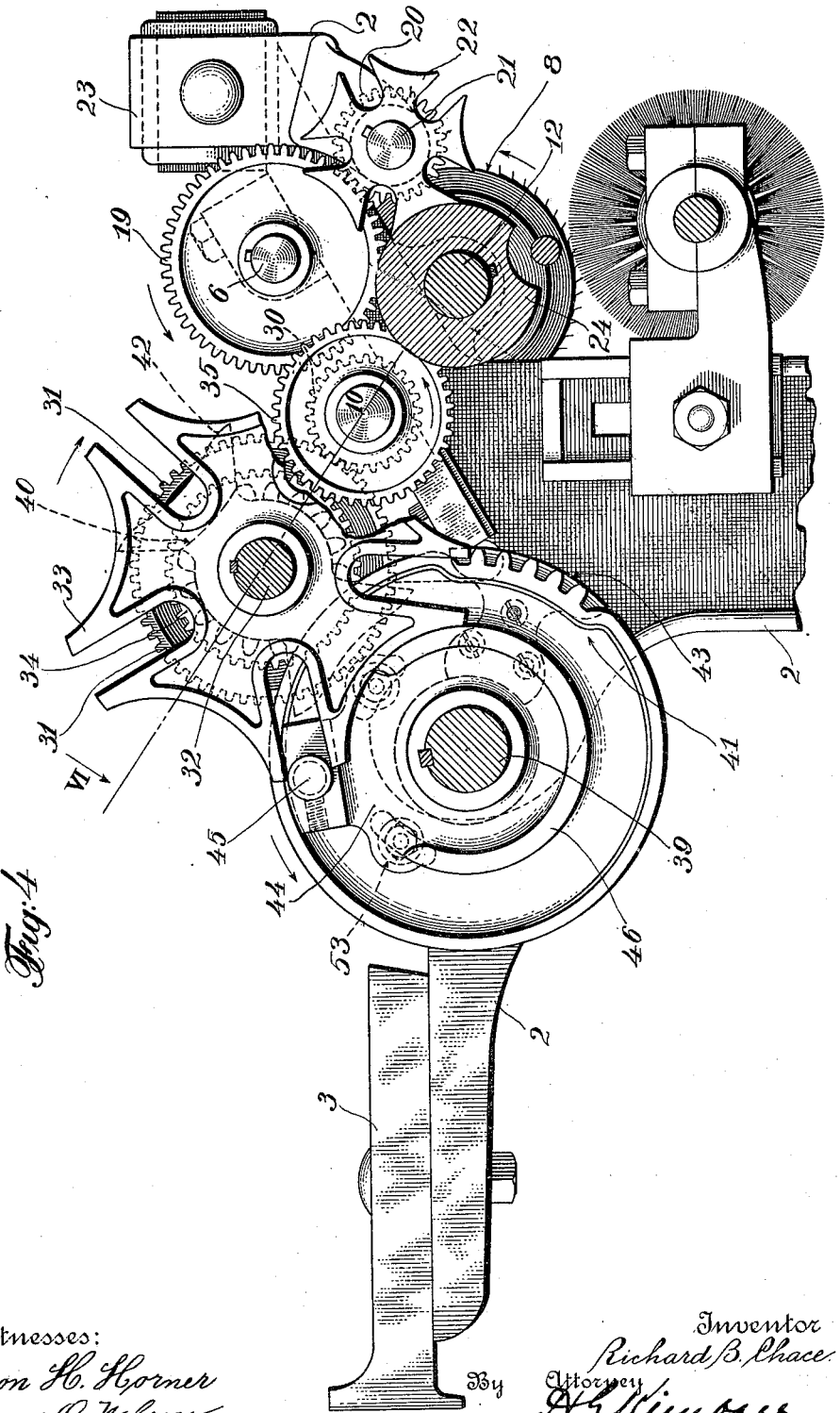

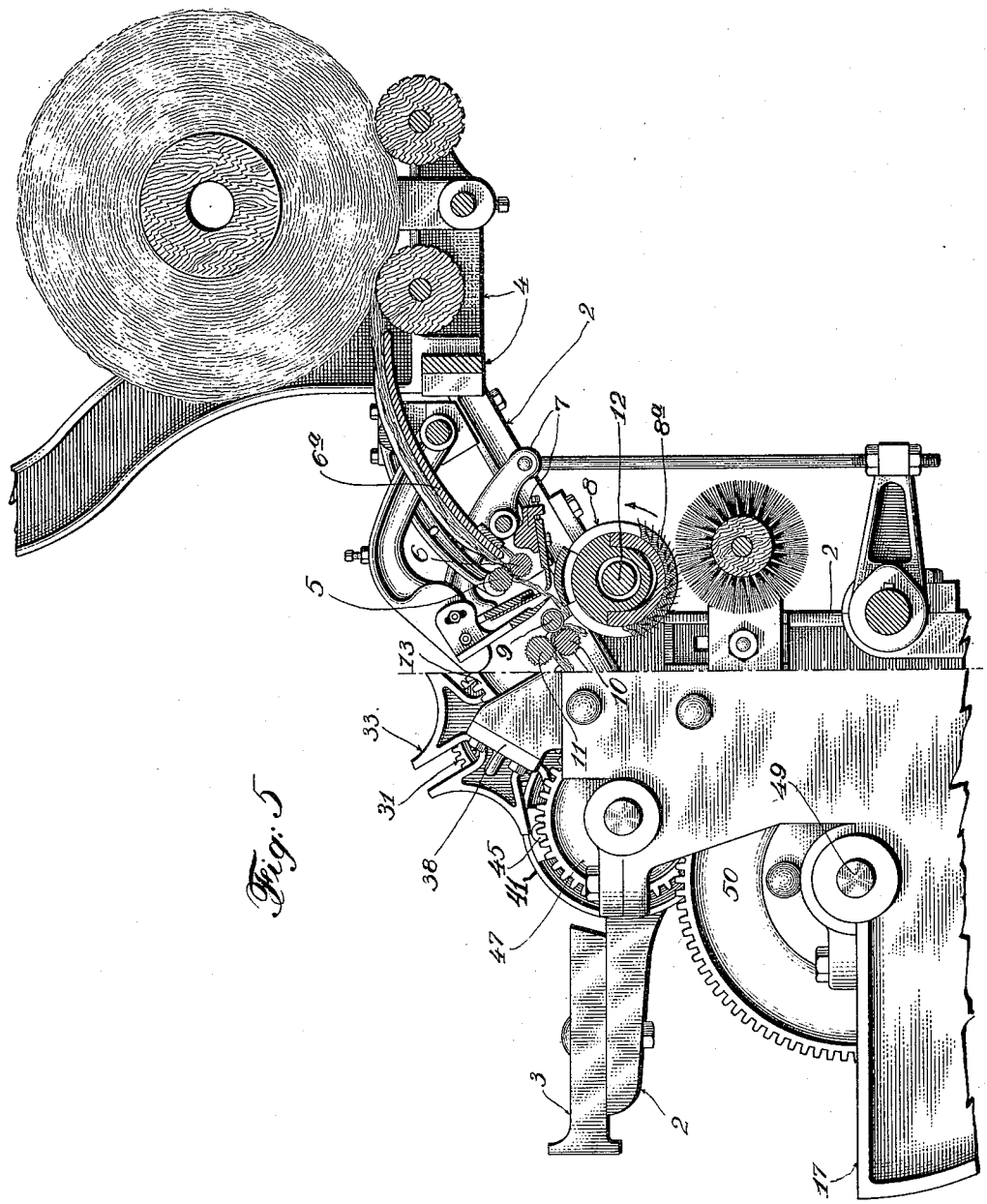

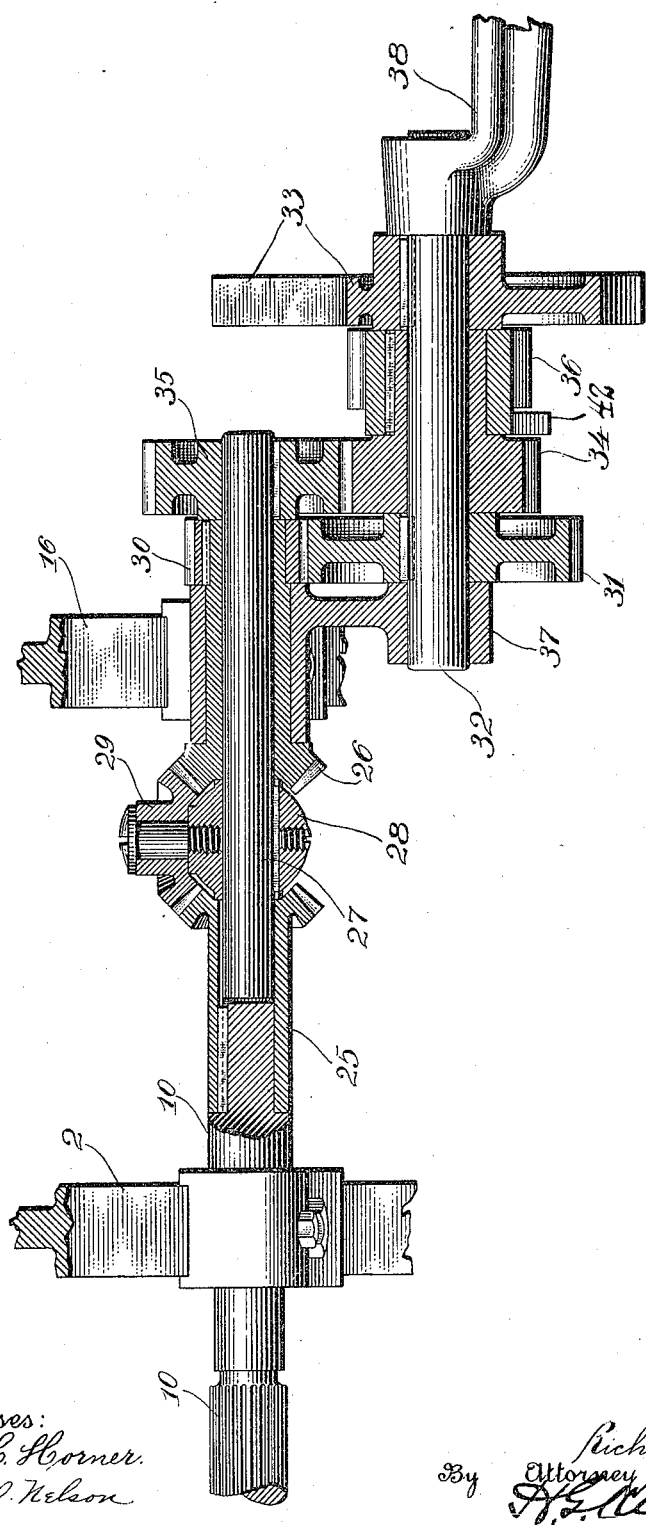

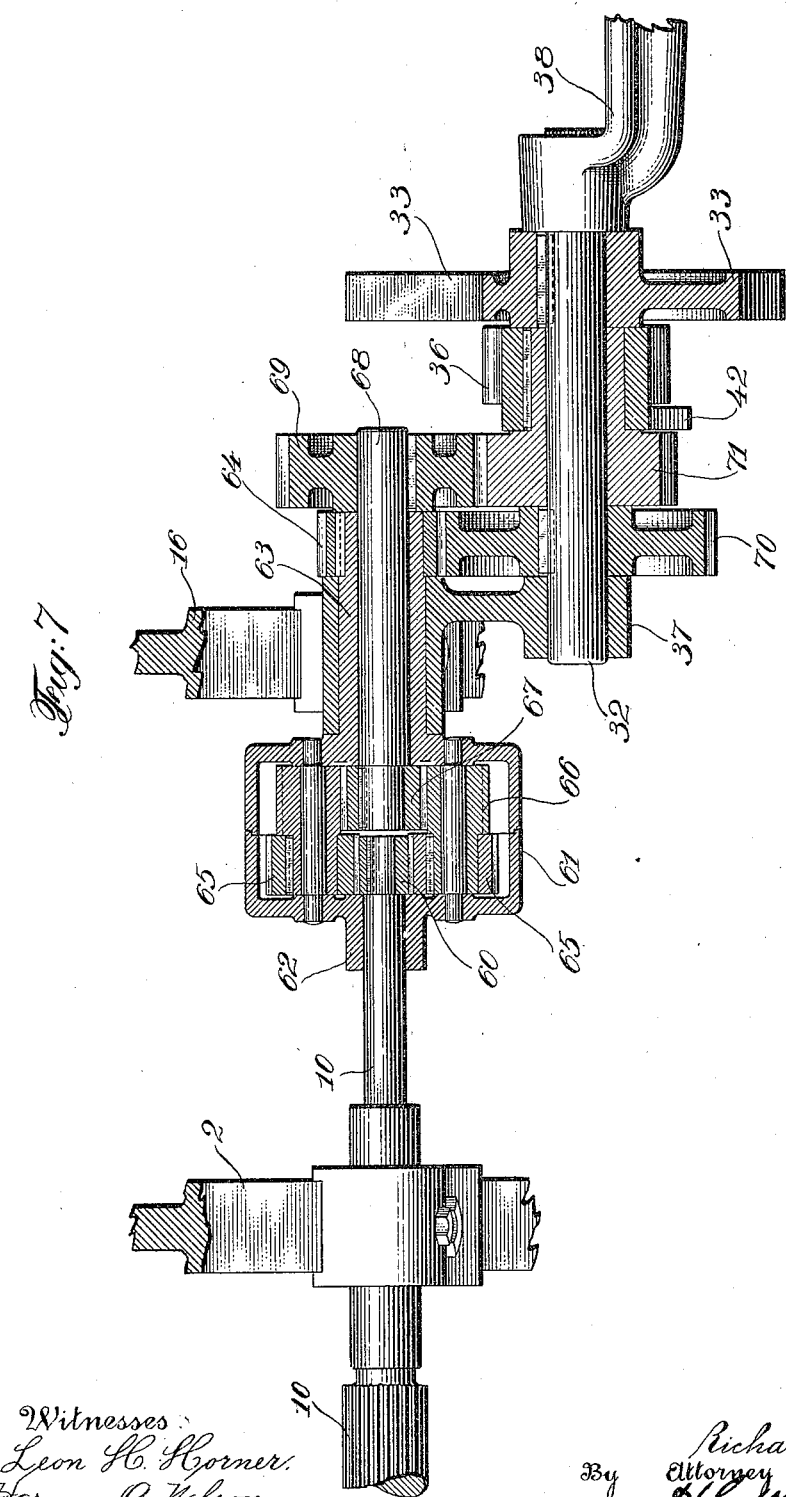

UNITED STATES PATENT OFFICE.

RICHARD B. CHACE, OF WHITINSVILLE, MASSACHUSETTS, ASSIGNOR TO THE WHITIN MACHINE WORKS, OF WHITINSVILLE, MASSACHUSETTS, A CORPORATION OF MASSACHUSETTS.

COMBING-MACHINE.

1,133,006.  Specification of Letters Patent.  Patented Mar. 23, 1915.

Application filed December 20, 1910. Serial No. 598,302.

*To all whom it may concern:*

Be it known that I, RICHARD B. CHACE, a citizen of the United States, residing at Whitinsville, in the county of Worcester and Commonwealth of Massachusetts, have invented certain new and useful Improvements in Combing-Machines, of which the following is a full and true specification as required by statute.

The invention is an improvement in Heilmann combers, the object being to improve the action of the piecing-motion in such machines and to increase the rate of production of combed sliver, also to simplify the construction and reduce the space occupied by the driving parts of such machines.

The invention also aims to provide for the convenient adjustment of the extent of forward and backward movements of the piecing rolls and also further improvements and advantages which, if not particularly described below, will be apparent to those who are skilled in the construction and in the operation of Heilmann combers.

To the above ends, the invention contemplates the actuation of the several piecing-rolls by means positively connecting the same to the source of power without the interposition or use of clutch members or other separable driving parts, and the adjustment of such actuating connecting means whereby the dwell between the alternate movements of the piecing rolls may be reduced to the smallest fraction of the cycle and a full and positive movement is given to the piecing-rolls in both directions, thereby resulting in a heavier and more uniform and also a more rapid piecing of the sliver than has hitherto been attainable. In the modern multiple head cotton comber, serving laps twelve inches wide, the piecing-roll shaft which is common to all the six or more combing heads, is a long shaft and, on account of the parts with which it coöperates, is likewise necessarily of relatively small diameter. The speed of operation of these machines is limited, as is well known, by the fact that the piecing of the tufts becomes irregular and uncertain when higher speeds are attained and this irregularity I have observed is due in large measure to the reaction in such slender shafts, resulting not only from their momentum but also from their torsional tendencies under their rapid reversals of motion, and my invention is directed to means for eliminating or restraining the causes of such reaction, whereby higher speeds may be attained with perfectly regular piecing of the tufts.

The drawings forming part hereof, illustrate the preferred and one of the several possible forms of actuating connections involving the principles of this invention and providing the advantages above indicated. In these drawings there are seven figures.

Figure 2:
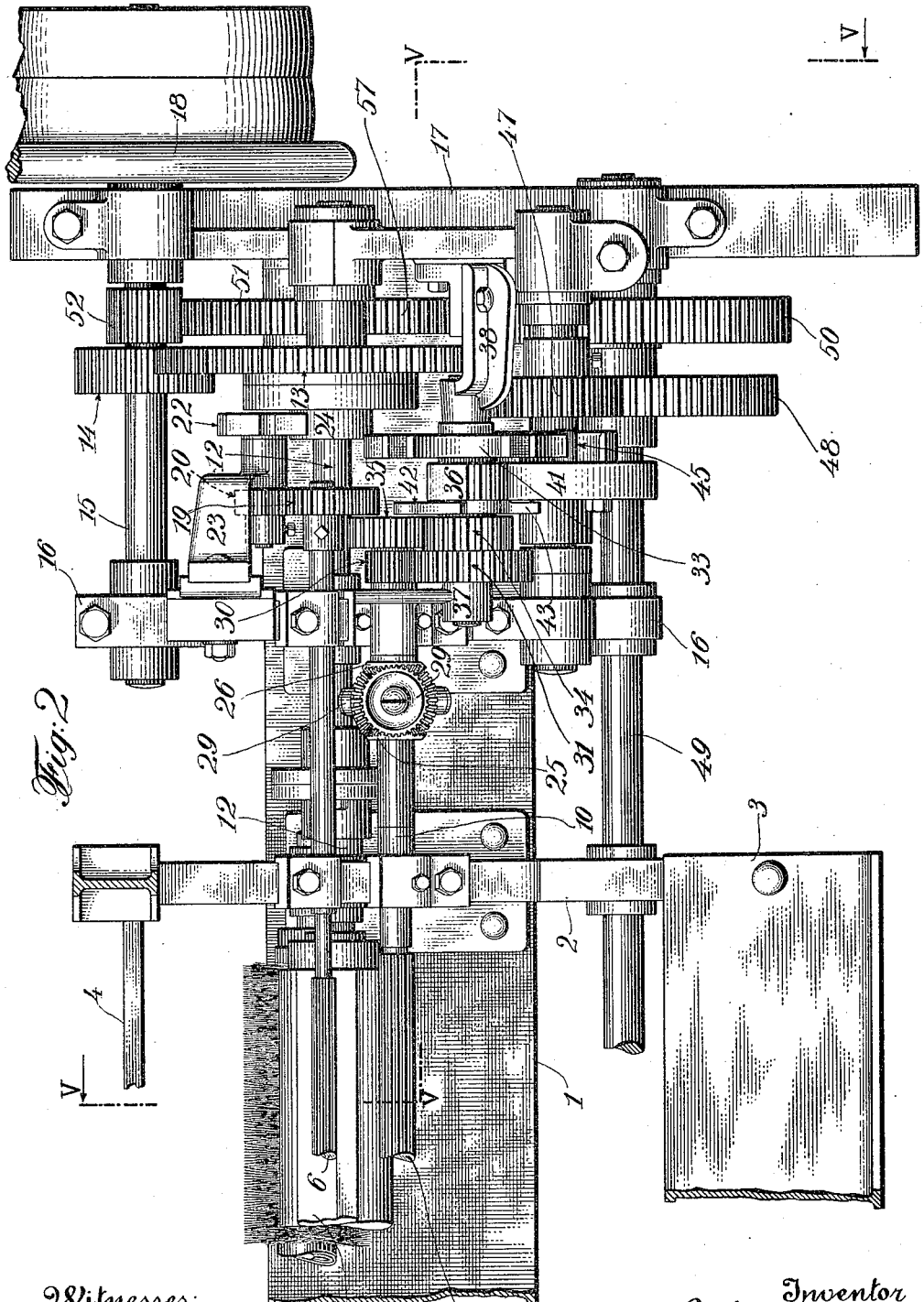
Figure 3:
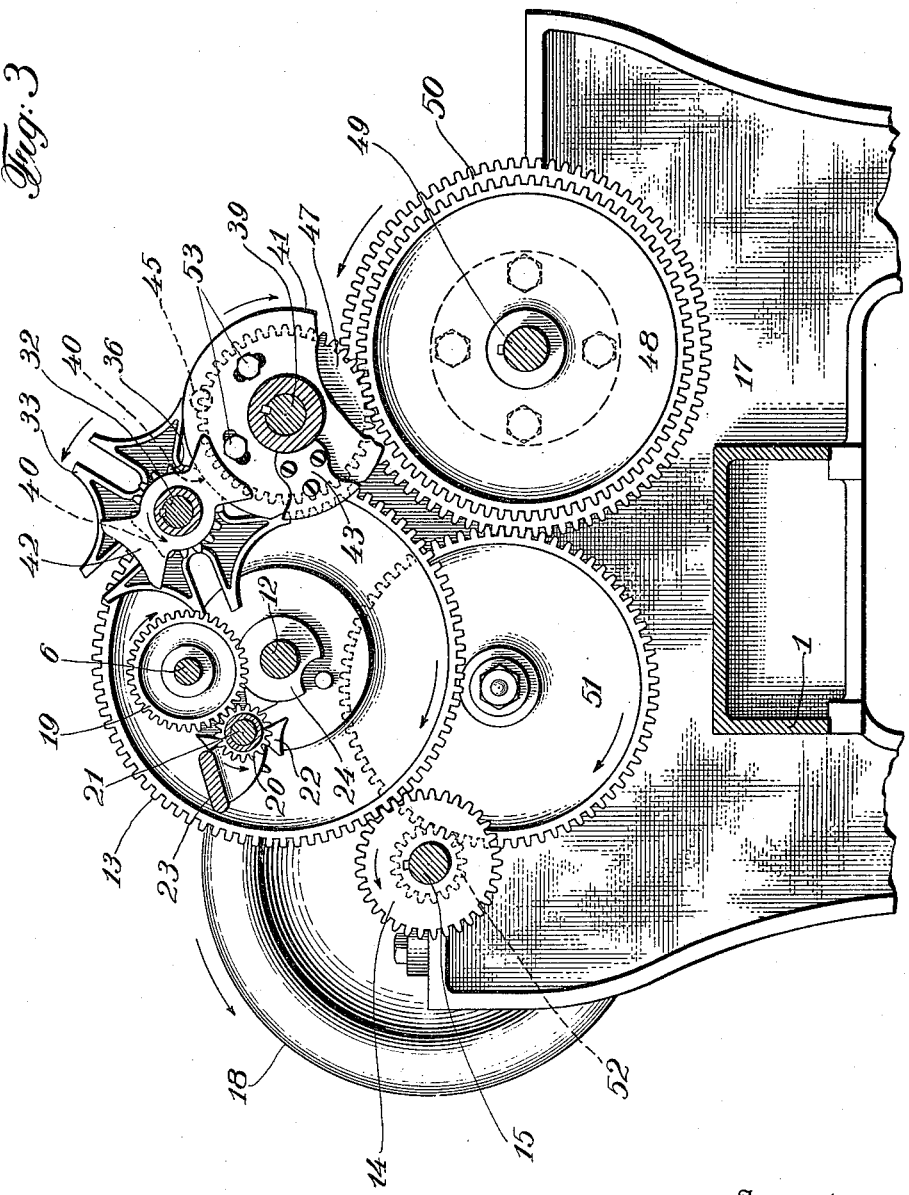

Figure 1 is a front elevation of the driving-head of a Heilmann cotton comber involving the present invention, parts of the adjacent combing head being also shown as well as the connection of such parts with their respective driving elements; Fig. 2 is a top plan of the parts shown in Fig. 1; Fig. 3 is a section of Fig. 1 on line III—III of that figure taken in the direction of the arrows, a part of one of the intermittent gears being broken out to show the parts behind it; Fig. 4 is a similar section on line IV—IV of Fig. 1 in the direction of the arrows and on a slightly larger scale; Fig. 5 is a similar section view taken on line V—V of Fig. 2; Fig. 6 is a section of Fig. 4 on line VI in the direction of the arrow showing the epicyclic train; and Fig. 7 is a modified form of the epicyclic train.

Figs. 1, 2 and 5 show certain familiar parts of the well known Heilmann comber, the part designated 1, being the main table-girder of the machine extending the length thereof, as will be well understood, and forming the support for the several combing-heads, as well as for certain parts of the drive-head. The several parts of the combing-heads are carried on a series of frame uprights 2, one only of which is shown in the drawings. On their forward sides these uprights carry the sliver apron 3, and at their rear the supporting devices 4 for the rolls or bales of uncombed sliver upon which the machine operates. Each comber-head comprises, in substance, a pair of feed rolls 5 and 6 (Fig. 5) by which the lap is periodically advanced over a feed apron 6$^a$ into the jaws of the nipper-mechanism which is marked 7; a combing cylinder 8, comprising in the present case a combing half-lap 8$^a$ by which the projecting tuft is combed, and a detaching half-lap or segment 8$^b$, which coöperates with the set of drawing-off rolls 9, 10 and 11 to detach the tuft in the manner well understood. In the multiple head type of Heilmann comber, that being the kind herein shown, the lower feed rolls, combing cylinders and the lowermost of the drawing-off rolls are all mounted or formed on shafts which are common to all the several combing heads and terminate at the drive-head where they are coupled to the parts from which they receive their respective motions. The drawing-off rolls receive an intermittent, alternately opposite motion which effects the overlapping or piecing of the successive detachments of staple, as will be understood by those skilled in the art, and the combed sliver emerging from these rolls moves from thence to the sliver apron 3 on which it travels to the draw-head and sliver-can, as will also be well understood. Below the combing cylinder there is mounted a rotary brush and other familiar means, not however shown in the present drawings, for cleaning the cylinder and transmitting the refuse and waste to receptacles in the rear of the machine. The end of the shaft 12 of the combing cylinder which extends into the drive-head, carries fast upon it the large spur gear or index wheel 13, which is driven by a pinion 14 on the primary drive-shaft 15. This drive-shaft, as shown in the drawings, is journaled at one end in an intermediate frame upright 16 planted on the table-girder, and at the other end on the main end standard 17 of the machine frame. The main driving pulley 18 is on the outer end of this shaft. The extended end of the shaft of the feed roll 6, carries a spur gear 19, meshing with a spur pinion 20 fast on a shaft 21, which shaft also carries a star wheel 22, and is journaled in a bracket bearing 23 adjustably bolted to the intermediate support 16. The star wheel carried on this shaft is engaged to be rotated intermittently, by a pin wheel 24 mounted on the combing shaft 12 adjacent to the hub of the index wheel 13 of that shaft. The constant rotation of the index wheel, imparted to it by the drive-shaft 15 imparts an intermittent motion to the star-wheel in the obvious manner and thence, through the spur gearing just described, to the feed rolls 6 whereby the lap is periodically advanced at the proper moment in the combing cycle. The nipper mechanism 7, it will be understood, is supplied with the usual or suitable means for opening the jaws thereof, coincidently with the advance of the lap, and then closing to hold the lap during the operation of combing and detaching, such means being connected for operation from the nipper-cam shaft 49, described below, or in some other suitable way. As these operating means form no part of the present invention, description thereof may be omitted.

While they are coöperating with the detaching segment (8$^b$) of the combing cylinder, the detaching and piecing rolls 9, 10 and 11 are required to move forwardly and at the same surface speed as that of the segment, and immediately after the detachment of the tuft has been accomplished, they are required to move in the reverse direction so that the tail end of the tuft just detached will be projected rearwardly and the forward end of the next succeeding tuft will be properly pieced or overlapped upon it. Heretofore and generally these rolls have received this alternately opposite rotation through the agency of one or more specially constructed notched wheels or clutch members connected by gearing to the shaft of the lower piecing roll 10 and driven by one or more cam-actuated pawls or equivalent devices, the operating cams of which are designed to provide a forward motion of about two-thirds of a rotation and backward motion of about one-third. In this and all other forms of piecing motions of which I am aware, the piecing rolls are momentarily out of direct connection with the driving power during the intervals between their alternate movements, as for example when the pawl is withdrawing from one notch of its wheel to enter the next, and there is also a considerable dwell of the piecing rolls in such machines between their reverse and forward rotations, due to the time necessarily consumed in reversing the motion of the actuating member. In the case of the cam actuated piecing-motion the lost motion existing between the lever on which the pawl or equivalent device is carried and the heel of the cam groove, produces the dwell referred to and this of course increases with wear. Both of these interruptions to the positive driving connection between the piecing rolls and the source of power, impose limitations on the speed of the comber which are quite out of reason, as I have found, with the capabilities for speed of the rest of the mechanism, and furthermore seriously interfere with the proper piecing or overlapping of the cotton tufts.

By the present invention the piecing-rolls are maintained constantly in positively controlled driven relation to the primary drive-shaft with little or no lost motion and no more dwell of the piecing rolls at the moment of reversal than mechanically necessary, the connecting gearing being such that the rolls are held against any appreciable displacement or play with respect to the power shaft at all times. The form of constantly connected gearing I have found most suited for the machine shown is a combination of the epicyclic train and one or more intermittent gear-couples connecting the train with the primary drive-shaft in such a way that the latter shaft will be in constant and positive gear with two of the main revoluble elements of the train under all conditions, and preferably also in such manner as to drive them in the same direction. I prefer to employ the simplest form of the epicyclic train and to connect one of the main revoluble gear-elements thereof directly to the end of the long shaft by which the several piecing-rolls are actuated or upon which they are carried. One of the terminal gear-elements of the train is preferably the one connected to this piecing roll shaft, and as shown in the drawing this element is a bevel pinion 25 keyed to the projecting end of shaft 10. The other terminal gear-element of the train—a similar wheel element or bevel pinion 26,—has a long base or hub (see Fig. 6) by which it is journaled in the intermediate frame upright 16 in alinement with the pinion 25. The intermediate revoluble gear-element of the epicyclic train is comprised of a spindle 27 supported at one end within the hub of the terminal element 25 and at its other within the sleeve or hub of the terminal element 26 and carrying fast upon it between the two gears a suitable spider or frame 28 on which are journaled one or more intermediate pinions 29. In the form shown by Figs. 1–6, the intermediate frame is formed of an approximately spherical hub equipped with three projecting arms or studs radially arranged thereon at about 120° apart, and upon which the three intermediate bevel pinions 29 are journaled. These pinions mesh on either side with the teeth of the terminal gear-elements of the train, that is to say the bevel-pinions 25 and 26, so that by holding the terminal pinion 26 stationary and revolving the intermediate frame and its pinions, the other terminal gear-element 25 (and the piecing roll shaft 10) will be revolved in one direction, and by holding the intermediate frame and revolving the terminal gear element 26 in the same direction, the element 25 and piecing roll shaft will be revolved in the opposite direction. Actuation and control of the terminal gear-element 26 is accomplished through a pinion 30 keyed to the end of its hub on the opposite side of its journal seat, this pinion meshing with the spur gear 31 fast on the short shaft 32, which shaft also has keyed to it a star-wheel 33. The intermediate gear-element or frame of the epicyclic train is driven through its spindle 27 by the pinion 35 keyed thereon and meshing with the spur gear 34, which gear 34 is idly mounted on the shaft 32 and carries a mutilated pinion 36 keyed to its elongated hub immediately adjacent to star-wheel 33. The shaft 32 is mounted at one end in a journal seat 37 on the frame upright 16 and at the other end in a gooseneck bracket 38 planted on the frame 17. The mutilated pinion 36 and the star-wheel 33 are respectively the driven members of a mutilated gear couple and a pin and star-wheel couple, these being the intermittent gear couples I have above referred to as the means for actuating the epicyclic train. The couple which comprises the mutilated pinion drives the terminal gear element 26 of the epicyclic train, and the star-wheel couple drives the frame element of the epicyclic train independently of the first mentioned couple, though both couples receive their motion from the same shaft—the counter-shaft 39—upon which their driving members are mounted, as presently described. The mutilated pinion 36 is provided, in the present instance, with two oppositely disposed groups of teeth, with the intermediate spaces left blank and cylindrically concaved as shown by the dotted line curve at 40 in Figs. 3 and 4 so that it will be adapted to be engaged and locked against rotation by the cylindrical-convex peripheral portion of its driving gear 41, the latter being the other member of the couple. This gear 41 is keyed to the counter-shaft 39, as shown in Fig. 3, and has a single group of teeth, about five in number, adapted to mesh with the teeth on the mutilated pinion in the obvious manner, imparting motion thereto during the engagement between the teeth, and holding the pinion locked against rotation while the convex periphery of 41 engages the concave periphery of the other, all of which, it will be observed, is according to the usual action of this form of intermittent gearing. In order to avoid the effects of wear on the teeth of these mutilated gears, the pinion is provided with two oppositely extending plate fingers 42 of greater diameter than the pinion itself and arranged to overlap the side face of the gear-wheel 41, and the latter wheel is provided with a corresponding tappet finger 43 properly arranged thereon to engage the fingers 42 at the instant or slightly before the mutilated teeth of both couples come into engagement, thereby starting the pinion in motion slightly in advance of the engagement of the teeth. Inasmuch as the fingers on the pinion have a longer active radius than the pinion itself, the effect of the parts thus arranged is to alleviate the shock of engagement as well as to avoid or reduce the wear on the entering teeth.

On the opposite side face of the gear 41, it carries a plate 44 adjustably secured thereon by bolts, shown at 53, and formed with a lateral projection or pin 45 and also with an interrupted cylindrical lock-ring 46, which is concentric with the counter-shaft 39 on which it is carried. This pin-and ring-bearing plate forms the driving member of the star-wheel couple, the pin being adapted to enter the radial notches in the star-wheel and the ring to engage the cylindrical-concave spaces intervening between the notches, so that the star-wheel is held stationary between its intermittent rotations.

The compound gear-wheel thus formed, and comprising the parts 41, 44, 45 and 46, is carried on the counter-shaft 39, which is journaled in the frame parts 16 and 17, and driven through the spur-gear 47, which gear is keyed to the counter-shaft, in mesh with a larger spur-gear 48 on the shaft 49. This latter shaft, which has been above referred to as the nipper-cam shaft, is driven through its gear 50, and the large idler 51 (Figs. 2 and 3) by the pinion 52 of the primary drive-shaft 15. The motion thus imparted to the compound driving wheel of the two gear-couples, is constant and in the direction of the arrows appearing on the drawings, and the relations of the two gear-couples is such that the driven member of one becomes active either at the instant of cessation of the driven member of the other or shortly thereafter, the said members being either both held or one held and the other active, for every position of the compound wheel, there being no moment in the combing cycle when either member is not either driven or else positively held against rotation, by the action of the locking part of its driving means. The actions of these parts are timed in this way so that the piecing-roll shaft may have constant angular motion during its forward rotation, as referred to below. The piecing-roll shaft thus receives a definite and positive movement, forwardly and backwardly, being held absolutely fixed during the intervals between motions, but the gear-couples are so set that the interval between the end of the forward rotation, which is produced by the action of the mutilated couple, and the beginning of the next backward rotation, produced by the star-wheel couple, is of the shortest possible duration, thus establishing a condition in which there is no appreciable dwell of the piecing rolls at this point of the cycle. The action will be apparent from a consideration of the compound wheel shown in Fig. 3.

In connection with the form of intermittent, interlocking gearing just described, it should be here pointed out that the important consideration for which it is employed in the present invention is that it constantly maintains the elements of the epicyclic combination in the positive relation just referred to and hence, as stated, precludes the possibility that the piecing-roll shaft can rotate or be rotated with relation to the rest of the mechanism save in the manner and to the extent definitely prescribed by the gearing itself under its actuation by the power-shaft. This constant control of the piecing-roll shaft whereby it is permanently and constantly maintained in definite relation to the drive shaft, can be obtained by other means for actuating the driving elements of the epicyclic train, because, as will now be apparent, the peculiar interdependence of the three essential elements of an epicyclic combination is such that any two of them can form parts of two positive driving connections between the drive shaft and the third element and can simultaneously and jointly control the action of the said third element without relinquishment of such positive connection at any point in the cycle; that is to say, the two driving epicyclic elements (27—28—29 and 26 in the present case) can impart to the other or driven element (25) any desired amounts of forward and backward rotation, such driving elements being always in positively controlled relation from the primary source of movement and having always constant positive control of the driven element. Thus it is possible that the said driving elements of the epicyclic can receive their positive motion from a common driving agent, such as the countershaft in the present case, through paths which are separate, though existing partly in a single compound structure. In the case illustrated, the path of the motion proceeding from the countershaft (39) divides at or in the compound gear structure (41—44—45) and extends thence through separate members to the respective driving elements of the epicyclic, eventually coinciding in the driven and controlled element of the epicyclic. The important condition is that the control of the driving source upon the motion of the piecing-rolls shall be uninterrupted throughout the whole combing cycle, so that the piecing-rolls cannot overstep by momentum or by the torsion in the long piecing-roll shaft and their rotative movements cannot in the least vary from one combing cycle to the next. At the same time, however, it should also be pointed out that, for the attainment of constant forward roll speed, the independent, alternate driving of the two epicyclic train elements of itself effects much saving of space and promotes higher comber speeds, irrespectively of whether the driving members are functioned to lock or interlock with such elements in the manner specified during the inactive periods, and this specific means of utilizing the epicyclic train is likewise included within this invention as will appear from certain of the appended claims.

I have preferred to use the mutilated form of intermittent gear-couple for driving the intermediate epicyclic train element, since this element produces the forward rotation of the piecing-rolls which takes place while they are engaged with the detaching segment of the combing cylinder, and because the motion imparted by the mutilated couple is of a constant rate, and therefore causes the rolls to move in perfect unison with the surface of the segment. The pin and star-wheel couple is preferred for reversely driving the piecing rolls, partly because of the compactness with which it can be assembled with the mutilated gear-couple, as has been made apparent above, and partly because the motion transmitted by it is variable, being a motion which first accelerates and then retards as will be readily seen. The piecing rolls are not engaged by the detaching segment when rotating backward, and the transmission of such variable speed rate to them serves to avoid sharp backward pull on the freshly laid sliver lap. The gear ratios of the several gear-couples and the gears connecting them with the piecing-roll shaft are to be understood as relatively proportioned to provide about two-thirds of a revolution forward and one-third of a revolution backward for each revolution of the compound wheel, or combing cycle, with a period of rest between each forward and the following backward rotation, but this relation can be modified to any extent by changing the connecting gears in the obvious manner. The shaft 32, above referred to, by reason of its shortness and the manner of its mounting, is readily removable so that the gears 30, 31, 34 and 35 thereon can be quickly supplanted by others which will give any ratio of forward and back movement that may be desired, as will be perfectly obvious to the manufacturers of combers.

In the modified device of Fig. 7 the construction of the constant-gear connections of the piecing-roll shaft is the safe as that already described, except for the use of spur-gearing exclusively in the epicyclic train. In this case the piecing-roll shaft 10 carries fast upon it the terminal gear wheel element 60 in the form of a small spur-gear. The intermediate gear element comprises a frame 61, of box form, corresponding to the hub 28 and arms of Fig. 6, sleeved at 62 over the end of the piecing-roll shaft and having its tubular boss 63 journaled in the intermediate frame support 16, the outer end of the boss being supplied with a driving pinion 64 keyed to it on the outer side of the journal seat, like the pinion 30 previously described. The pinions of the intermediate gear element are double spur-gears carried on short shafts fixed in the end walls of the box, with the members 65 thereof meshing with the terminal gear 60 and the members 66 meshing with the remaining terminal gear-wheel element 67. The latter gear is keyed to the spindle 68 which revolves within the tubular hub of the box frame and is driven by a spur gear 69, mounted thereon at its outer extremity, lipe the pinion 35 previously described. The gears 64 and 69 mesh respectively with the shaft gear 70 on shaft 32 and with the sleeve gear 71 idly mounted on the said shaft. The pinion 36 of the mutilated, intermittent and interlocking gear couple heretofore described, is keyed to the hub of the gear 71 and the star-wheel 33—the driven member of the star wheel couple also above described—is keyed to the shaft 32 as before, so that when these two intermittent gear members are alternately driven and locked by their complementary driving members, the intermediate gear-element (61, 65, and 66) and the terminal gear-element (67) are alternately driven and held, and the piecing roll-shaft thus receives the same positive forward and back motion as above explained.

The box-like frame of the epicyclic train is intended to contain oil so that the gears may run in oil and hence be less subject to wear and accumulation of dirt, and it is desirable to provide lubrication and protection in like manner to the bevel-gear train of the form first described.

While I have above described my invention in the form which I consider to be the best adaptation and application of the principles thereof, I wish it to be understood that except where specifically stated, the claims hereto attached are not to be regarded as limited to such preferred form, nor to the details of proportions or arrangement of the parts thereof, and also that various changes, omissions and substitutions can be made in the comber that has been illustrated without departing from my invention.

I claim:

1. In a cotton comber, a forwardly and backwardly rotating piecing-roll shaft, and a non-separable train of driving gearing connecting the same constantly in positively controlled relation to the drive-shaft of the comber.

2. In a cotton comber, a primary shaft, a forwardly and backwardly rotating piecing-roll shaft and a train of gearing between said shafts connecting the latter in constant positively controlled relation to the former, and comprising the combination of an epicyclic train and a form of intermittent gearing.

3. In a cotton comber, a primary shaft, a forwardly and backwardly rotating piecing-roll shaft and a train of gearing between these shafts connecting the latter in constant positively controlled relation to the former, said train of gearing comprising two intermittent gear-couples provided with means to lock the piecing-roll shaft during a period of rest between its alternate motions.

4. In a cotton comber, a primary shaft and a forwardly and backwardly rotating piecing-roll shaft, in combination with an epicyclic train connected to the latter shaft and interlocking, intermittent gearing connected in permanently geared relation to the primary shaft and epicyclic train.

5. A cotton comber comprising means for advancing the lap and means for combing, detaching and piecing the same, including a combing cylinder, piecing-rolls, a piecing-roll shaft, and a countershaft, in combination with an epicyclic train having one of its revoluble gear-elements connected to the piecing-roll shaft and a compound rotary structure including gear teeth and a stud member on the countershaft for actuating the other elements of the epicyclic train.

6. A cotton comber comprising means for advancing, combing, detaching and piecing the staple and including a combing cylinder, and piecing rolls, in combination with an epicyclic train having one of its revoluble gear elements connected with the piecing-rolls and means for alternately driving the other two elements of the epicyclic train in the same direction.

7. A cotton comber comprising in combination with suitable feeding and combing means, detaching mechanism including piecing-rolls and a piecing-roll shaft, an epicyclic train having one of its terminal gear-elements connected with this shaft, and means for intermittently rotating both the intermediate gear-element and the other terminal gear-element of the epicyclic train.

8. A cotton comber comprising the combination of feeding and combing means, and detaching and piecing means, the latter including an epicyclic train and a piecing-roll shaft connected with one of the revoluble gear-elements thereof, the other two gear-elements of the said train being provided with independent means whereby they are actuated.

9. In a comber, a forwardly and backwardly rotating piecing-roll shaft, an epicyclic train comprising two driving elements and a driven element, the latter being connected to the piecing-roll shaft, an operating shaft and a set of actuating members for each of said driving elements connecting the same continually in positively controlled relation to said operating shaft and coöperating with said elements to impart forward rotation to the said piecing-roll shaft at constant speed.

10. In a cotton comber, the combination of the piecing-roll shaft and an epicyclic train having one of its revoluble gear-elements connected therewith, the remaining elements of the train having individual actuating members connected thereto and a common driving agent for said members.

11. In a cotton comber, the combination of the piecing-roll shaft and an epicyclic train having its terminal gear-element connected therewith and individual means of operation for the remaining elements of said train comprising interlocking, intermittent gear couples.

12. In a cotton comber, an epicyclic train having one of its revoluble gear-elements connected with the piecing-roll shaft thereof and means on each of the remaining elements of the epicyclic train whereby they may be independently actuated, in combination with an intermediate shaft bearing the driven member of an interlocking, intermittent gear couple connected to one of said elements, and a countershaft bearing the driving member of such couple, and means for rotating the countershaft.

13. In a cotton comber, an epicyclic train having one of its revoluble gear-elements connected with the piecing-roll shaft thereof and means on the remaining elements of said train whereby they may be independently rotated, in combination with an intermediate shaft bearing the driven members of two interlocking, intermittent gear couples, and a countershaft bearing the driving members of such couples, and individual connections between said driven members and the remaining gear-elements of the epicyclic train.

14. In a cotton comber, the combination with the piecing-roll shaft and an epicyclic train having one of its revoluble gear elements connected therewith, of means for operating the two remaining elements of said train comprising a mutilated gear couple for one of said elements and a star-wheel couple for operating the other.

15. In a cotton comber, the combination with the piecing-roll shaft and an epicyclic train having one of its revoluble gear-elements connected therewith, of a mutilated gear couple connected with another of the elements of the train to rotate the piecing-roll shaft forwardly, and independent gearing connected with the remaining train element to rotate said roll shaft backwardly.

16. In a cotton comber, a piecing-roll shaft, and means for driving the same alternately backwardly and forwardly comprising two intermittent gear-couples, and a countershaft whereon the driving members of said couples are mounted, said members being relatively adjustable on said shaft with respect to the angular positions thereof.

17. In a cotton comber, a shaft having piecing-rolls thereon, an epicyclic train having one of its gear-elements mounted directly upon the end of said shaft and means for alternately driving each of the remaining elements of said train in the same direction to rotate the said piecing rolls forwardly and backwardly.

18. In a cotton comber, a piecing-roll shaft, an epicyclic train having its terminal gear-element mounted directly upon the end of said shaft and an intermediate gear-element comprising a pinion-bearing frame and spindle, in combination with means for driving the said spindle and the remaining terminal gear-elements of the train alternately and in the same direction.

19. In a cotton comber, a piecing-roll shaft, an epicyclic train for driving same and interlocking, intermittent gearing connected for driving two of the main revoluble elements of said train, comprising a mutilated gear-wheel adapted for operating one of said elements and bearing a lateral pinlike projection adapted for intermittently operating the other of said elements and means for revolving said gear-wheel.

20. In a cotton comber, a piecing-roll shaft, an epicyclic train for operating the same and driving connections between two of the gear-elements of said train and the driving source, said connection comprising a removable shaft and gear-wheels thereon determining the relation of the forward and back rotation of the piecing-roll shaft.

21. A multiple head cotton comber comprising a series of combing heads having a drive head at one end thereof, a fixed piecing-roll shaft common to all of the combing heads and terminating in the drive-head, piecing rolls in said combing heads coöperating with the piecing-roll shaft therein, a drive shaft also journaled in the drive head, an epicyclic train comprising a driven element connected to the piecing-roll shaft and two driving elements for said driven element, actuating means for said two driving elements connecting each of them constantly in positively controlled relation to such drive shaft and causing them to impart alternate forward and backward rotation to the said piecing-roll shaft, a rotary combing half-lap in each combing head for combing the end of the lap therein, means for presenting such ends to the said piecing rolls for detachment thereby, and top combs through which such rolls draw the combed tufts in their forward movement.

22. A multiple head cotton comber comprising a series of combing heads having a drive head at one end thereof, a fixed piecing-roll shaft common to all of the combing heads and terminating in the driving head, piecing rolls in said combing heads coöperating with the piecing-roll shaft therein, an actuating shaft mounted in the drive head, an epicyclic train comprising a driven element connected to said piecing-roll shaft and two driving elements for said driven element, a compound rotating structure mounted on said actuating shaft within the drive head, including gear teeth and a revolving stud member, means connecting said members in positive controlling relation to each of said driving elements and operating the same to impart alternate forward and backward rotation to the piecing-roll shaft, means including a rotating combing-half-lap in each combing head for combing the end of the lap therein, means for presenting such ends to the said piecing rolls for detachment thereby, and top combs through which such rolls draw the cylinder combed tufts in their forward movement.

23. A multiple head cotton comber comprising a series of combing heads having a drive head at one end thereof, a fixed piecing-roll shaft common to all of the combing heads and terminating in the drive head, piecing rolls in said combing heads coöperating with the piecing roll shaft therein, means for operating the piecing-roll shaft alternately in forward and backward directions comprising a gear wheel member connected therewith, a frame journaled coaxially with said gear wheel, an epicyclic wheel member journaled on the frame and engaging said gear wheel, an actuating shaft mounted in the drive head and means also in said drive head connecting the said frame and epicyclic wheel member constantly in positively controlled relation to said actuating shaft, a rotary combing half-lap in each combing head for combing the end of the lap, means for presenting such ends to the said piecing rolls for detachment thereby, and top combs through which such rolls draw the combed tufts in their forward movement.

24. A multiple head cotton comber comprising a series of combing heads having a drive head at one end thereof, a forwardly and backwardly rotating piecing-roll shaft common to all of the combing heads and terminating in the drive head, piecing rolls in said combing heads coöperating with the piecing-roll shaft therein, an actuating shaft journaled in the drive head, an epicyclic train connecting said shaft in constantly controlled relation to the piecing-roll shaft and operating the same to start the backward rotation of said shaft at a gradually increasing rate of speed, means including a rotary combing half-lap in each combing head for combing the end of the lap therein, means for presenting such ends to the said piecing rolls for detachment thereby, and top combs through which said rolls draw the combed tufts in their forward movement.

In testimony whereof, I have signed this specification in the presence of two witnesses.

RICHARD B. CHACE.

Witnesses:
  JEREMIAH J. FOLEY,
  OSCAR L. OWEN.